No. 684,694. Patented Oct. 15, 1901.
J. KENNEDY.
BLOWING ENGINE.
(Application filed July 19, 1899.)

(No Model.)

WITNESSES
Warren W. Swartz
A. M. Corwin

INVENTOR
Julian Kennedy
by Bakewell & Bakewell
his atty's

UNITED STATES PATENT OFFICE.

JULIAN KENNEDY, OF PITTSBURG, PENNSYLVANIA.

BLOWING-ENGINE.

SPECIFICATION forming part of Letters Patent No. 684,694, dated October 15, 1901.

Application filed July 19, 1899. Serial No. 724,347. (No model.)

*To all whom it may concern:*

Be it known that I, JULIAN KENNEDY, of Pittsburg, in the county of Allegheny and State of Pennsylvania, have invented a new and useful Improvement in Blowing-Engines, of which the following is a full, clear, and exact description, reference being had to the accompanying drawings, forming part of this specification, in which—

Figure 1:
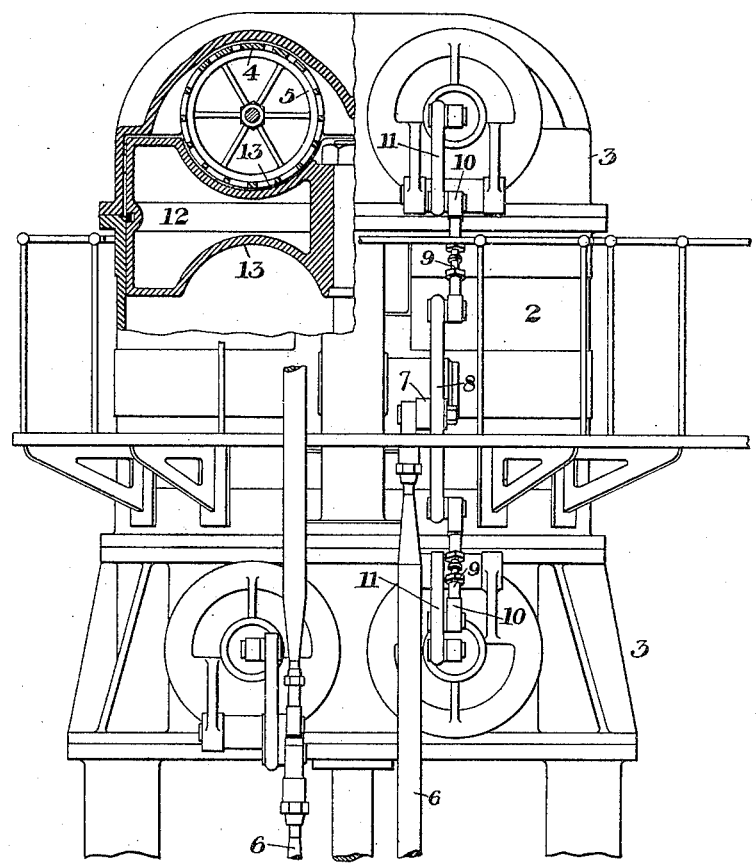
Figure 2:
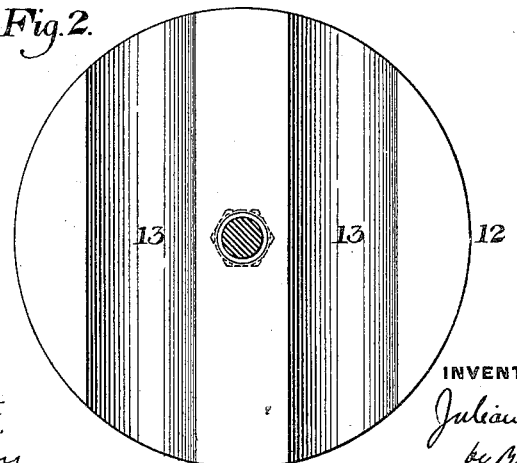

Figure 1 is a side elevation, partly broken away, of a blowing-engine constructed in accordance with my invention; and Fig. 2 is a top plan view of the piston.

My invention relates to that class of blowing-engines wherein cylindrical balance-valves are employed for controlling ports in suitable casings secured to the heads of the cylinder. Heretofore in this type of blowing-engines there was a considerable amount of clearance at the ends of the cylinder, with a consequent loss in economy.

My invention overcomes this difficulty; and it consists in placing a curved perforated cage extending across one head and partially within the end of the cylinder, placing a cylindrical valve within the cage, and recessing the piston, so that the valve will enter these recesses at the end of a stroke, and thus greatly reduce the amount of clearance.

In the drawings, 2 represents a vertical blowing-cylinder having casings 3 3 secured to its head and containing curved perforated cages or gratings 4, extending transversely of the head and partially within the cylinder. Each of these slotted gratings contains an endwise-movable cylindrical valve 5, which valves are actuated by connections from the crank-shaft of the engine or a counter-shaft thereof. I have shown the valves as connected up in pairs, each pair being actuated from a connecting or eccentric rod 6. The upper end of this rod is connected by an arm 7 to a rock-arm 8, each arm of which is connected by adjustable link 9 with lever 10 on a stub-shaft carrying a lever 11. The levers 11 are pivotally connected to the projecting ends of the valve-stems, and the valves are thus reciprocated in the desired manner within their cages. The piston 12 is provided in each face with curved recesses 13, which are entered by the valve-cages at the end of each stroke of the piston.

The operation of the engine is similar to that of other blowing-engines of this type. The clearance-spaces are, however, greatly reduced and a corresponding economy obtained by the peculiar location of the valves and cages and the recessing of the pistons.

Many changes may be made in the form of the valves, the means for operating them, and in the form of the piston without departing from my invention.

I claim—

1. A blowing-engine having a curved perforated cage or grating extending across one head and partially within the cylinder, a transverse cylindrical valve movable within the cage, actuating connections for moving the valve across the cylinder within the cage, and a piston having a recess arranged to receive the cage at the end of the stroke; substantially as described.

2. A blowing-engine having at each end curved perforated cages within the cylinder-space, cylindrical balanced valves within the cages, mechanism for reciprocating the valves endwise across the cylinder within the cages, and a piston movable in the cylinder and having in its opposite faces curved recesses to fit over the cages at the ends of the stroke; substantially as described.

In testimony whereof I have hereunto set my hand.

JULIAN KENNEDY.

Witnesses:
H. M. CORWIN,
G. B. BLEMMING.